Patented Dec. 17, 1946

2,412,928

UNITED STATES PATENT OFFICE 2,412,928

PRODUCTION OF ACETO-ACETIC ESTERS AND THEIR HOMOLOGUES

Karl Heinrich Walter Tuerck, Banstead, and Hans Joachim Lichtenstein, London, England, assignors to The Distillers Company Limited, Edinburgh, Scotland, a British company No Drawing. Application November 13, 1944, Serial No. 563,308. In Great Britain November 19, 1943

18 Claims. (Cl. 260—483)

This invention relates to the manufacture of organic esters of aceto-acetic acid and its homologues.

Esters of aceto-acetic acid, e. g. ethyl acetoacetate, have been generally produced by reacting sodium or sodium ethoxide with ethylacetate. Another method of making ethyl acetoacetate, which avoids the necessity of using at least stoichiometric quantities of sodium, consists in reacting diketene with alcohols. The disadvantage of this process, however, lies in the difficulty of manufacture of ketene and diketene which has to be obtained by cracking acetone or acetic acid at high temperatures.

It has now been found that alkyl esters of acetoacetic acid can be prepared commercially in good yields.

It has already been suggested in U. S. A. Patent No. 1,614,195 to prepare alpha-keto esters by subjecting the vapours of ethers of alpha-hydroxy acids to the action of oxygen at temperatures between 100°–500° C. use being made of metal oxides as catalysts. This is, however, a pure oxidation process as distinct from the simple dehydrogenation reaction of the present invention.

It is further known that, unlike alpha-hydroxyacids, beta-hydroxyacids such as beta-hydroxybutyric acid, tend to split off water when heated and be converted to crotonic acid (see Beilstein, vol. III, page 308), and it is known that acrylic esters are formed almost exclusively when beta-hydroxypropionic esters are passed over catalytic surfaces at elevated temperatures (see prior British Patent No. 361,153 and the corresponding U. S. A. Patent No. 1,890,277). It is therefore surprising that in the process according to our invention, which is characterised by the use of temperatures within the limits of 200°–400° C. and of metal catalysts known to have a dehydrogenating effect in the absence of oxygen, the formation of unsaturated esters can be practically avoided. On the other hand, it could also not be foreseen that the produced ethyl acetoacetate would be stable enough under the conditions used in the process according to the invention, as it is known that at higher temperatures ethyl aceto-acetate undergoes dehydration to dehydracetic acid and even decomposes to produce low molecular weight compounds and gaseous products (see Beilstein, vol. III).

Our process may be applied generally to the alkyl esters of beta-hydroxy acids, such as beta-hydroxybutyric acid, in which a secondary hydroxyl group is in the beta-position to the carboxyl group.

According to the present invention, there is provided a process for the manufacture of alkyl esters of aceto-acetic acid and its homologues which comprises passing a compound of the general formula $R_1CH(OH).CH_2$—$COOR_2$ over a dehydrogenating catalyst at a temperature between 200° and 400° C.; suitable catalysts are, for example, metallic copper, silver and brass. In the general formula $R_1$ and $R_2$ represent the lower saturated alkyl groups containing not more than four carbon atoms such as methyl, ethyl, propyl, isopropyl or butyl groups.

The reaction may be carried out at normal or slightly increased pressure, or in vacuo, especially in those cases where higher boiling esters are being used.

Inert gases, e. g. nitrogen, or inert organic substances or inert unsaturated substances which accept the formed hydrogen, may be present. Methyl crotonate is a particularly suitable hydrogen acceptor. From the fact that the secondary beta-hydroxy esters undergo, under the above described conditions, a spontaneous dehydrogenation, there follows the important advantage that any local overheating inside the catalyst can be safely avoided. This is not possible in the oxidation process described in U. S. A. Patent No. 1,614,195.

The catalysts may be used on carriers such as magnesium oxide, magnesite, alumina or corroded metals. We prefer, however, to use the metals such as silver or copper or their alloys, in the form of gauze or filings. It is advisable to reduce the catalyst beforehand by treatment with hydrogen at reaction temperature.

Though the reaction proceeds within 200°–400° C. satisfactorily, we prefer to use temperatures between 270°–370° C. especially when working with a copper catalyst.

The methyl and ethyl aceto-acetic esters are readily recoverable from the liquid reaction mixture by steam-distillation thereof since they are only slightly soluble in water whereas the corresponding beta-hydroxybutyrates are completely water-miscible.

The following examples illustrate the manner in which the invention may be carried into effect.

*Example I.*—22 gms. methyl beta-hydroxybutyrate are passed per hour through a tube of 10 mm. diameter filled with 5 mm. pieces of copper wire (1 mm. thick) which was obtained by reducing broken commercial copper oxide wire with hydrogen. The catalyst tube was heated so that the end of the catalyst layer showed a temperature of 330° C. the temperature of the furnace being 340° C. The reaction product was cooled. The condensate contained 35.3% by weight of the original methyl beta-hydroxybutyrate in the form of methyl aceto-acetate, and 54.2% by weight of the original methyl beta-hydroxybutyrate unchanged. Acetone was found as a by-product but no unsaturated substances. The gas contained (by volume) 69.8% hydrogen, 23.6% carbon dioxide and 4.2% carbon monoxide.

*Example II.*—By carrying out the process as in Example I but maintaining a catalyst temperature of 360° C. (furnace temperature 370° C.) 28.2% by weight of the original methyl beta-hydroxybutyrate is obtained as methyl aceto-acetate, 53.8% by weight of unchanged methyl-beta-hydroxybutyrate being found in the condensate, as well as 6.1% by weight as unsaturated ester. The gas contained (by volume) 28.7% carbon dioxide, 64.4% hydrogen and 3.1% carbon monoxide.

*Example III.*—By maintaining the conditions of Example I but heating the catalyst tube to 420° C. only 3.2% by weight of the original methyl beta-hydroxy butyrate was obtained as methyl aceto-acetate, 43% by weight of the original methyl beta-hydroxybutyrate being found in the condensate, as well as 13.2% by weight as methyl crotonate and large amounts of acetone. The gas contained (by volume) 41.4% carbon dioxide and only 26.6% hydrogen together with 15.7% higher paraffins. During the run the activity of the catalyst declined rapidly.

*Example IV.*—When carrying out Example II in the presence of air (2.7 litres per hour), only 3.5% by weight of the original methyl beta-hydroxybutyrate is obtained as methyl aceto-acetate, while only 59% by weight of the ester was found unchanged in the condensate.

*Example V.*—Through a reaction tube 6 ft. long and of an internal diameter of ⅝ of an inch which contained 3 inches of 8-mesh brass gauze (60% copper and 40% zinc) 40 ccs. of ethyl hydroxy-butyrate were passed per hour. The temperature of the tube was maintained at 330–340° C. and the ethyl hydroxy-butyrate was passed through a 6 ft. preheating tube before entering the reactor. The reaction product was condensed, the condensate being found to contain appreciable quantities of ethyl aceto-acetate. Gas formation was three times that obtained when treating the corresponding methyl ester and the gas produced was found to contain a minor proportion of olefines.

The effect of the temperatures on the various yields may be seen by the following table:

| Temp. | | Yields | | | Gas content | |
| --- | --- | --- | --- | --- | --- | --- |
| Inside tube, °C. | Outside tube, °C. | Methyl aceto-acetate, percent | Unchanged methyl beta-hydroxy butyrate, percent | Unsat. ester, percent | Hydrogen, percent | $CO_2$, percent |
| 234 | 235 | 2.87 | 92.3 | None | 70 | 30 |
| 250 | 255 | 2.2 | 93.0 | None | 53 | 45 |
| 275 | 280 | 11.2 | 81.9 | 2.7 | 69 | 27 |
| 300 | 306 | 26.3 | 62.4 | 3.2 | 75.4 | 20.1 |
| 300 | 304 | 19.7 | 61.1 | None | 68.4 | 25.9 |
| 333 | 340 | 35.3 | 54.2 | None | 69.8 | 23.6 |
| 360 | 370 | 28.2 | 53.8 | 6.1 | 64.4 | 28.7 |
| 420 | ------ | 3.2 | 43.0 | 13.2 | 26.6 | 41.4 |

What we claim is:

1. A process for the manufacture of alkyl esters of aceto-acetic acid which comprises passing the vapours of a beta-hydroxybutyric ester of a saturated aliphatic alcohol containing not more than four carbon atoms, over a dehydrogenating catalyst at a temperature between 200° and 400° C.

2. A process according to claim 1 wherein the reaction temperature is between 270° and 370° C.

3. A process according to claim 1 wherein the dehydrogenating catalyst is metallic copper.

4. A process according to claim 1 wherein the dehydrogenating catalyst is metallic silver.

5. A process according to claim 1 wherein the dehydrogenating catalyst is brass.

6. A process for the manufacture of methyl aceto-acetate which comprises passing methyl beta-hydroxybutyrate over a dehydrogenating catalyst at a temperature of 200° to 400° C.

7. A process for the manufacture of ethyl aceto-acetate which comprises passing ethyl beta-hydroxybutyrate over a dehydrogenating catalyst at a temperature of 200° to 400° C.

8. A process for the manufacture of methyl aceto-acetate which comprises passing methyl beta-hydroxybutyrate over metallic copper at a temperature of 270° to 370° C.

9. A process for the manufacture of ethyl aceto-acetate which comprises passing ethyl beta-hydroxybutyrate over metallic copper at a temperature of 270° to 370° C.

10. A process for the manufacture of methyl aceto-acetate which comprises passing methyl beta-hydroxybutyrate over a dehydrogenating catalyst at a temperature of 200° to 400° C. in the substantial absence of oxygen.

11. A process for the manufacture of methyl aceto-acetate which comprises passing methyl beta-hydroxybutyrate over metallic copper at a temperature of 270° to 370° C. in the substantial absence of oxygen.

12. A process for the manufacture of ethyl aceto-acetate which comprises passing ethyl beta-hydroxybutyrate over a dehydrogenating catalyst at a temperature of 200° to 400° C. in the substantial absence of oxygen.

13. A process for the manufacture of ethyl aceto-acetate which comprises passing ethyl beta-hydroxybutyrate over metallic copper at a temperature of 270° to 370° C. in the substantial absence of oxygen.

14. A process for the manufacture of methyl aceto-acetate which comprises passing methyl beta-hydroxybutyrate over metallic copper at a temperature of 270° to 370° C. and subjecting the liquid reaction mixture to steam distillation to separate the acetoacetic ester from the unchanged hydroxybutyric ester.

15. A process for the manufacture of ethyl aceto-acetate which comprises passing ethyl beta-hydroxybutyrate over metallic copper at a temperature of 270° to 370° C. and subjecting the liquid reaction mixture to steam distillation to separate the acetoacetic ester from the unchanged hydroxybutyric ester.

16. A process for the manufacture of methyl aceto-acetate which comprises passing methyl beta-hydroxybutyrate over metallic silver at a temperature of 200° to 400° C.

17. A process for the manufacture of methyl aceto-acetate which comprises passing methyl beta-hydroxybutyrate over brass at a temperature of 200° to 400° C.

18. A process according to claim 1 wherein the reaction is effected in the substantial absence of oxygen.

KARL HEINRICH WALTER TUERCK.
HANS JOACHIM LICHTENSTEIN.